(12) United States Patent
Moorman

(10) Patent No.: US 7,415,820 B2
(45) Date of Patent: Aug. 26, 2008

(54) HYBRID POWERTRAIN WITH VALVE ASSEMBLY FOR DUAL PUMPS

(75) Inventor: Steven P. Moorman, Dexter, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 207 days.

(21) Appl. No.: 11/363,519

(22) Filed: Feb. 27, 2006

(65) Prior Publication Data
US 2007/0199316 A1    Aug. 30, 2007

(51) Int. Cl.
*F16D 31/02* (2006.01)
*F16K 21/04* (2006.01)

(52) U.S. Cl. .......... 60/430; 137/114; 137/512.5

(58) Field of Classification Search ........... 60/421, 60/429, 430, 486; 137/112, 114, 512.5
See application file for complete search history.

(56) References Cited

U.S. PATENT DOCUMENTS 3,882,678 A    5/1975  Fassbender
4,368,752 A *  1/1983  Tamamori et al. .......... 137/112
4,445,818 A    5/1984  Ohsaki et al.
7,121,266 B2* 10/2006  Powell ........................ 137/112

FOREIGN PATENT DOCUMENTS

DE    2329328 A1    1/1975
DE    3206353 A1    9/1982

* cited by examiner

*Primary Examiner*—Michael Leslie

(57) ABSTRACT

A powertrain includes a first pump and a second pump. A conduit defines a passageway for providing hydraulic pressure from the first pump or the second pump to a transmission. A valve assembly is configured to selectively supply hydraulic pressure to the passageway solely from the first pump, solely from the second pump, and from both the first and second pumps. The valve assembly thus enables the first and second pump to augment one another, thereby enabling the size of at least one of the pumps to be smaller than would otherwise be possible without the valve assembly.

11 Claims, 3 Drawing Sheets

HYBRID POWERTRAIN WITH VALVE ASSEMBLY FOR DUAL PUMPS

TECHNICAL FIELD

This invention relates to valve assemblies configured to selectively supply hydraulic pressure to a transmission from two pumps.

BACKGROUND OF THE INVENTION

Hybrid powertrains typically employ an engine and an electric motor operatively connected to a transmission. The engine is stopped and restarted under certain conditions in order to improve fuel economy. When the engine is off, it is desirable to keep the transmission engaged in order to reduce the delay time to put power to the wheels when the driver commands it. Automatic transmissions require hydraulic pressure to be applied to clutches in order to maintain engagement. The hydraulic pressure is provided by an oil pump.

In prior art transmissions, the oil pump is driven by the engine. With the engine off, an alternative means to supply pressure to the clutches must be provided. Some prior art hybrid powertrains include an auxiliary pump driven by the electric motor to supply hydraulic pressure to clutches to maintain transmission engagement. A valve controls the hydraulic pressure so that it is provided either solely from the engine-driven pump or solely from the auxiliary pump. Accordingly, the main pump must be sized sufficiently to provide adequate pressure to maintain clutch engagement when the engine is at low speed.

SUMMARY OF THE INVENTION

A powertrain includes a first pump, a second pump, and a conduit defining a passageway. A valve assembly operatively interconnects the first pump, the second pump, and the passageway. The valve assembly is configured for at least three modes of operation. In a first mode, the valve assembly provides fluid communication between the first pump and the passageway and does not permit fluid communication between the second pump and the fluid passageway. In a second mode, the valve assembly provides fluid communication between both of the first and second pumps and the fluid passageway. In a third mode, the valve assembly does not permit fluid communication between the first pump and the passageway and provides fluid communication between the second pump and the passageway.

The valve assembly thus enables either pump to independently provide pressurized fluid to the passageway, and also enables both pumps to provide pressurized fluid to the passageway concurrently, such that each pump augments the other pump's output to the passageway. This augmentation enables at least one of the pumps to be smaller than prior art pumps, thus reducing fuel consumption of the pumps. The second mode of the valve also provides a smooth transition between operating with only the first pump and operating with only the second pump, i.e., the second mode reduces or minimizes impact to the pressure in the passageway in the transition from the first mode to the third mode.

In an exemplary embodiment, the powertrain includes a first power source, such as an electric motor, and a second power source, such as an internal combustion engine, and a transmission. The first and second power sources are in hybrid combination to supply torque to the input shaft of the transmission. The first power source is operatively connected to the first pump to selectively power the first pump, and the second power source is operatively connected to the second pump to selectively power the second pump. The passageway is in fluid communication with the transmission, and more specifically, the passageway is in fluid communication with the hydraulic clutch apply circuit of the transmission.

In an exemplary embodiment, the valve assembly is configured such that the first, second, and third modes occur automatically as a result of the hydraulic pressure supplied by the first and second pumps. More specifically, in the exemplary embodiment, the first mode automatically occurs when the hydraulic pressure from the first pump is higher than a first predetermined amount, the second mode automatically occurs when the hydraulic pressure from the second pump is higher than a second predetermined amount, and the third mode automatically occurs when the hydraulic pressure from the second pump is higher than a third predetermined amount.

A corresponding method is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
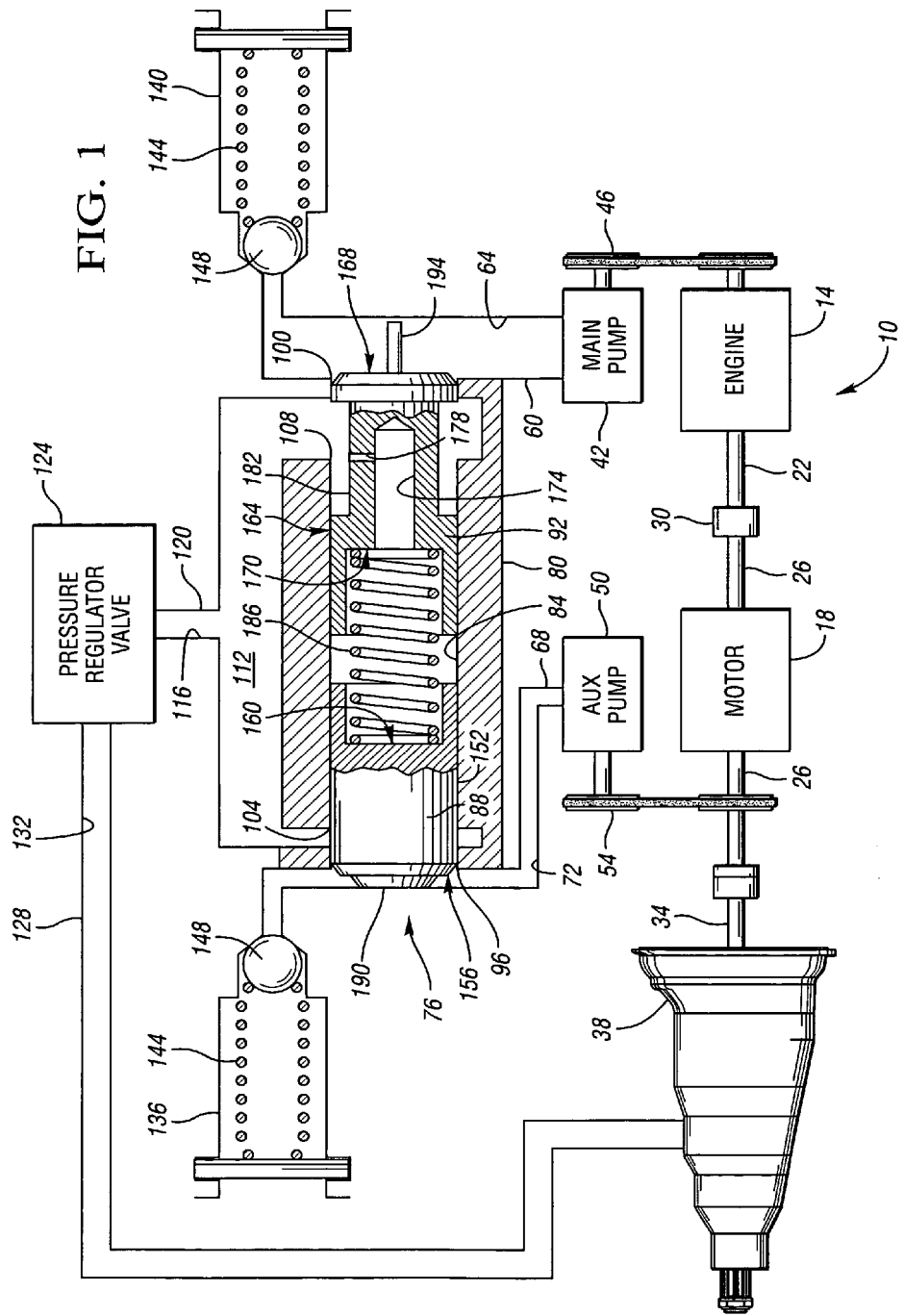
FIG. 1 is a schematic depiction of a hybrid drivetrain including a valve assembly shown in a partial cutaway side view in a first mode of operation.

Referring to FIG. 1, a hybrid powertrain 10 is schematically depicted. The powertrain 10 includes a first power source and a second power source in hybrid combination. In the embodiment depicted, the first power source is an engine 14 and the second power source is an electric motor 18. The engine 14 includes a rotatable crankshaft 22, and the electric motor 18 includes a rotor 26. A selectively-engageable torque transmitting device 30, such as a clutch, interconnects the rotor 26 and the crankshaft 22.

The rotor 26 is coupled to the input shaft 34 of a transmission 38 as understood by those skilled in the art. A selectively engageable torque transmitting device (not shown) or a hydraulic torque convertor (not shown) may be employed between the input shaft 34 and the rotor 26. Thus, the crankshaft 22 is also connected to the input shaft 34 of the transmission 38 via the rotor 26 when the torque transmitting device 30 is engaged. Accordingly, the rotor 26 and the crankshaft 22 are operatively connected to the input shaft 34 to selectively supply mechanical power thereto. Those skilled in the art will recognize other hybrid powertrain configurations that may be employed within the scope of the claimed invention.

A main pump 42 is operatively connected to the crankshaft 22 to be driven thereby, such as via a belt drive or chain drive 46. An auxiliary pump 50 is operatively connected to the rotor 26 to be driven thereby, such as via a belt drive or chain drive 54. A conduit 60 defines a passageway 64 that is in fluid communication with the main pump 42; the main pump 42 is configured to supply pressurized fluid, i.e., hydraulic pressure, to passageway 64 as understood by those skilled in the art. A conduit 68 defines a passageway 72 that is in fluid communication with the auxiliary pump 50; the auxiliary pump 50 is configured to supply pressurized fluid to passageway 72 as understood by those skilled in the art.

The powertrain 10 further includes a valve assembly 76 that is in fluid communication with passageways 64, 72. The valve assembly 76 includes a valve body 80 that defines a cylindrical chamber 84. The valve assembly 76 includes first and second shuttles 88, 92 that are positioned within the chamber 84 and that are configured for selective translation within the chamber 84. The chamber 84 is characterized by two ports 96, 100 defined by the valve body 80 at opposite ends of the chamber 84. Port 96 is in fluid communication with the passageway 72 of conduit 68, and therefore is also in fluid communication with the auxiliary pump 50. Port 100 is in fluid communication with the passageway 64 of conduit 60, and therefore is also in fluid communication with the main pump 42.

The chamber 84 is also characterized by two ports 104, 108 that interconnect the chamber 84 and another chamber 112. Ports 104, 108 extend radially from the chamber 84. Chamber 112 is in fluid communication with a passageway 116 defined by conduit 120. Passageway 116 is in fluid communication with a pressure regulator valve 124, and the pressure regulator valve 124 is in fluid communication with the transmission 38 to supply pressurized fluid to the hydraulic circuit of the transmission, which includes clutch apply chambers (not shown), as understood by those skilled in the art. More specifically, the pressure regulator valve 124 is in fluid communication with the transmission 38 via conduit 128, which defines passageway 132. Thus, the ports 104, 108 are in fluid communication with the passageway 116, the pressure regulator valve 124, and the transmission 38. An exemplary hydraulic circuit for a transmission is described in U.S. Pat. No. 5,601,506, issued Feb. 11, 1997 to Long et al., and which is hereby incorporated by reference in its entirety.

Passageway 72 is also in fluid communication with a blow-off valve 136, and passageway 64 is also in fluid communication with a blow-off valve 140, as understood by those skilled in the art. Each blow-off valve includes a spring 144 that biases a stopper 148. When the pressure in passageway 72 exceeds a predetermined amount, the pressure overcomes the bias of the spring 144 so that the stopper 148 does not obstruct the blow-off valve 136 and pressure is then reduced as fluid is released through the blow-off valve 136. Similarly, when the pressure in passageway 64 exceeds a predetermined amount, the pressure overcomes the bias of the spring 144 so that the stopper 148 does not obstruct the blow-off valve 140 and pressure is then reduced as fluid is released through the blow-off valve 140. The pressure at which blow-off valve 140 opens is higher than the pressure at which blow-off valve 136 opens.

Shuttle 88 is characterized by a generally cylindrical surface 152 that sealingly contacts the inner surface of the chamber 84. Shuttle 88 is also characterized by a surface 156 in fluid communication with the passageway 72 of conduit 68. Shuttle 88 is further characterized by surface 160 that is exposed to the chamber 84.

Similarly, shuttle 92 is characterized by a generally cylindrical surface 164 that sealingly contacts the inner surface of the chamber 84. Shuttle 92 is also characterized by a surface 168 that is in fluid communication with the passageway 64 of conduit 60. Shuttle 92 is further characterized by a surface 170 exposed to the chamber 84 and opposing surface 160. Shuttle 92 also defines a chamber 174 that is in fluid communication with the chamber 112 through port 108 and a feedback orifice 178 that extends radially with respect to the shuttle 92. Chamber 174 is open in the direction of shuttle 88 so as to be in fluid communication with chamber 84 and the surface 160 of shuttle 88. Shuttle 92 defines a concavity 182 in surface 164 to ensure that fluid communication between the feedback orifice 178 and the chamber 112 is not obstructed during movement of the shuttle 92.

A coil spring 186 is interposed between the shuttles 88, 92 within the chamber, and biases the shuttles 88, 92 apart from one another as shown in FIG. 1. The shuttle 88 is characterized by a protuberance 190 from surface 156; the protuberance 190 contacts a wall of conduit 68 to limit the movement of the shuttle 88. Similarly, member 194 protrudes from surface 168 of shuttle 92, and contacts a wall of conduit 60 to limit the movement of the shuttle 92.

A first mode of valve assembly operation is depicted in FIG. 1. More specifically, with the engine 14 and the motor 18 being stopped or off, the pumps 42, 50 do not pressurize fluid in the passageways 64, 72, allowing the spring 186 to bias the shuttles 88, 92 in respective closed positions as shown. Shuttle 88 obstructs ports 96 and 104 to prevent fluid communication between the passageway 72, and therefore the auxiliary pump 50, and the chamber 112. Shuttle 92 obstructs port 100, thereby preventing fluid communication between the passageway 64, and therefore the main pump 42, and chamber 112.

Figure 2:
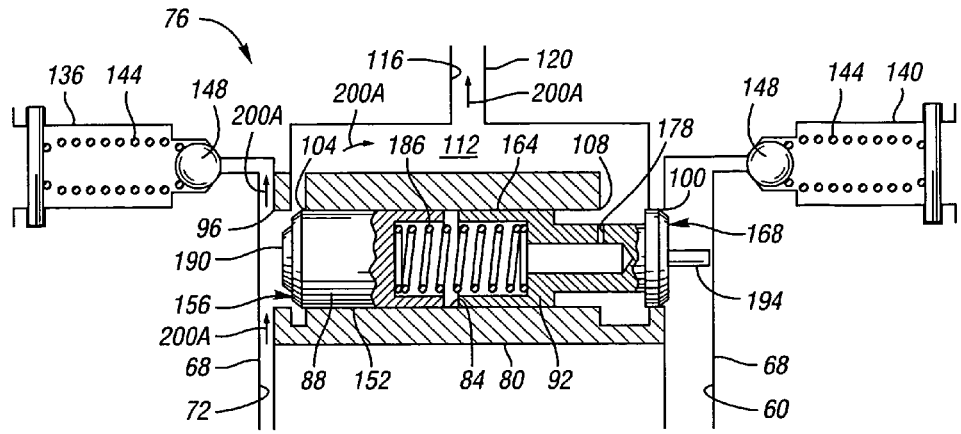
FIG. 2 is a schematic, partial cutaway side view of the valve assembly of FIG. 1 in a second mode of operation.

Referring to FIG. 2, wherein like reference numbers refer to like components from FIG. 1, the valve assembly 76 is shown in a second mode of operation. More specifically, the motor (shown at 18 in FIG. 1) is driving the auxiliary pump (shown at 50 in FIG. 1), which causes the auxiliary pump to supply pressurized fluid 200A into the passageway 72 of conduit 68. The pressurized fluid 200A exerts a force on surface 156 of shuttle 88. The force on surface 156 overcomes the bias of spring 186 and causes the shuttle 88 to translate toward shuttle 92 and into an open position as shown in which the shuttle 88 does not fully obstruct ports 96 and 104. Accordingly, when the shuttle 88 is in its open position, fluid communication is permitted between the chamber 112 and the passageway 72 via port 96, a portion of chamber 84, and port 104. Pressurized fluid 200A from the auxiliary pump thus enters chamber 112, passageway 116, and ultimately the clutch apply chambers of the transmission (shown at 38 in FIG. 1). Thus, the second mode of operation occurs automatically when the pressure in passageway 68 is sufficient to cause movement of shuttle 88 to its open position.

When the valve assembly is in the second mode of operation, the force of the fluid 200A on shuttle 88 compresses the spring 186 and produces a corresponding increase of force on shuttle 92; however, member 194 prevents shuttle 92 from being extended from the chamber 84 beyond its fully closed position shown in FIGS. 1 and 2 in which the shuttle 92 obstructs a flowpath between ports 100 and 108, thereby preventing fluid communication between passageway 64 and the chamber 112. During the first mode of operation, the engine (shown at 14) is not running, and thus the main pump (shown at 42 in FIG. 1) is not providing pressurized fluid to passageway 64.

Figure 3:
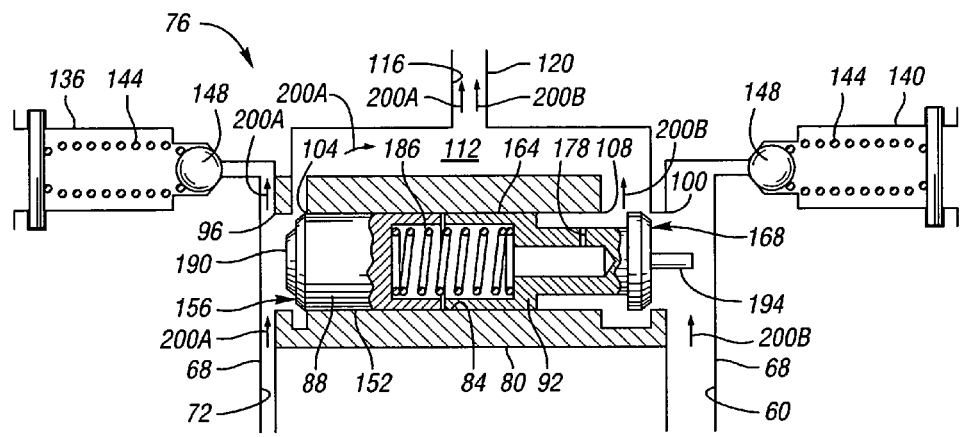
FIG. 3 is a schematic, partially cutaway side view of the valve assembly of FIG. 1 in a third mode of operation.

Referring to FIG. 3, wherein like reference numbers refer to like components from FIGS. 1 and 2, the valve assembly 76 is shown in a third mode of operation. More specifically, the engine (shown at 14 in FIG. 1) is running and driving the main pump (shown at 42 in FIG. 1); accordingly, the main pump supplies pressurized fluid 200B to the passageway 64 of conduit 60.

The pressurized fluid 200B exerts a force on surface 168 of shuttle 92. The force on surface 168 overcomes the bias of spring 186 and causes the shuttle 92 to translate toward shuttle 88 and into an open position as shown in which the shuttle 92 does not fully obstruct ports 100 and 108. Accordingly, when the shuttle 92 is in its open position, the chamber 112 is in fluid communication with the passageway 64 via port 100, a portion of chamber 84, and port 108. Pressurized fluid 200B from the main pump thus enters chamber 112, passageway 116, and ultimately the clutch apply chambers of the transmission (shown at 38 in FIG. 1).

The auxiliary pump also supplies pressurized fluid 200A during the second mode of operation, and thus, the pressurized fluid 200A maintains shuttle 88 in the open position, thereby allowing pressurized fluid 200A from the auxiliary pump to enter chamber 112. Accordingly, the third mode of operation occurs automatically when the pressure in passageway 64 is sufficient to move the shuttle 92 to its open position.

Figure 4:
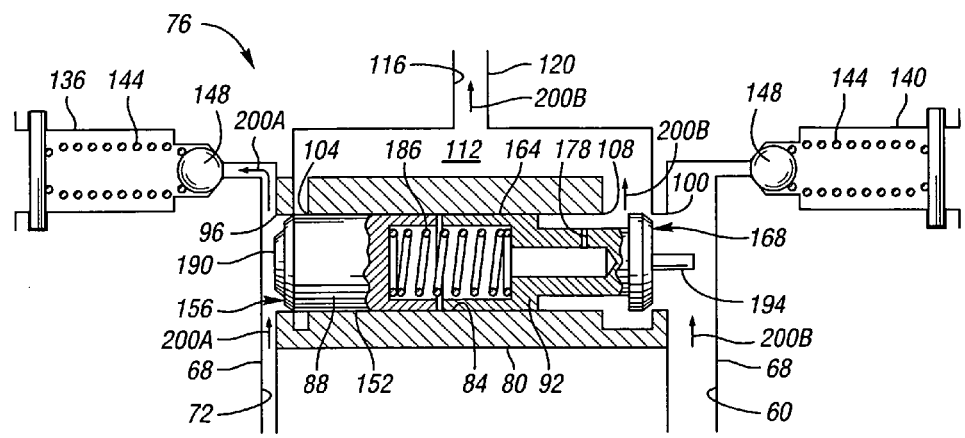
FIG. 4 is a schematic, partially cutaway side view of the valve assembly of FIG. 1 in a fourth mode of operation.

Referring to FIG. 4, wherein like reference numbers refer to like components from FIGS. 1-3, the valve assembly is shown during a fourth mode of operation. The fourth mode of operation is caused automatically when the fluid 200B, which is pressurized by the main pump, is at a higher pressure than the fluid 200A, which is pressurized by the auxiliary pump. More specifically, fluid 200B from the main pump exerts a force on shuttle 92, including surface 168, causing movement of the shuttle 92 with a corresponding compression of spring 186, which in turn exerts a force on shuttle 88, urging shuttle 88 to its closed position. Furthermore, the orifice 178 causes the pressure in chamber 174, and correspondingly the pressure in chamber 84 and on surface 160, to increase to the pressure in the passageway 64. The force exerted by the spring 186 and by the fluid acting on surface 160 is higher than the force exerted on the surface 156 of shuttle 88 by fluid 200A from the auxiliary pump, which is at a lower pressure than fluid 200B from the main pump. Accordingly, the shuttle 88 moves away from shuttle 92 to the position shown in which the shuttle 88 obstructs port 104, thereby preventing fluid communication between the auxiliary pump and the chamber 112.

Figure 5:
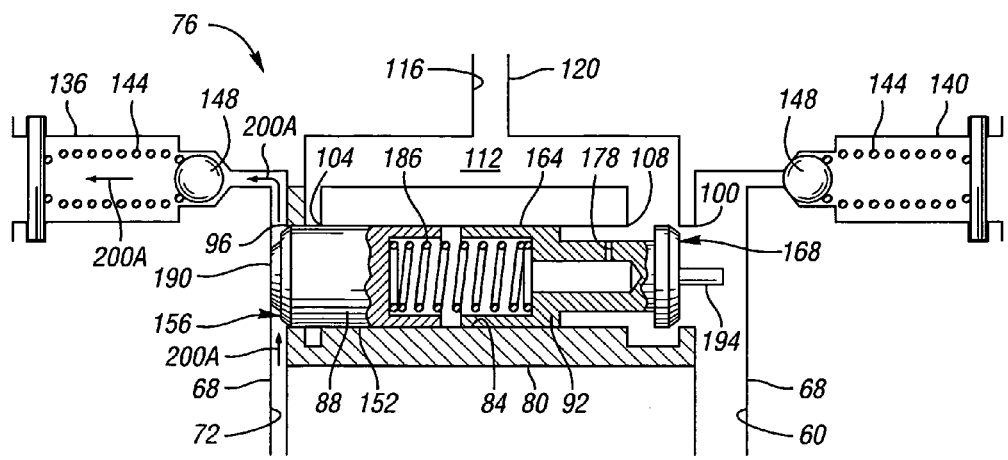
FIG. 5 is a schematic, partially cutaway side view of the valve assembly of FIG. 1 in a fifth mode of operation.

Referring to FIG. 5, wherein like reference numbers refer to like components from FIGS. 1-4, the valve assembly 76 is shown in a fifth mode of operation in which the pressure of fluid 200B is sufficiently greater than the pressure of fluid 200A so that the force exerted on shuttle 88, including surface 160, by the spring 186 and by fluid from the orifice 178 is sufficiently greater than the force exerted by fluid 200A on surface 156, thereby causing the shuttle 88 moves to its fully closed position in which the shuttle 88 obstructs both ports 96 and 104. Because the auxiliary pump is deadheaded, i.e., fluid flow from the auxiliary pump is blocked, the pressure of fluid 200A in passageway 72 will be sufficiently high such that fluid 200A will be released through the auxiliary blow-off valve, as shown in FIG. 5.

Figure 6:
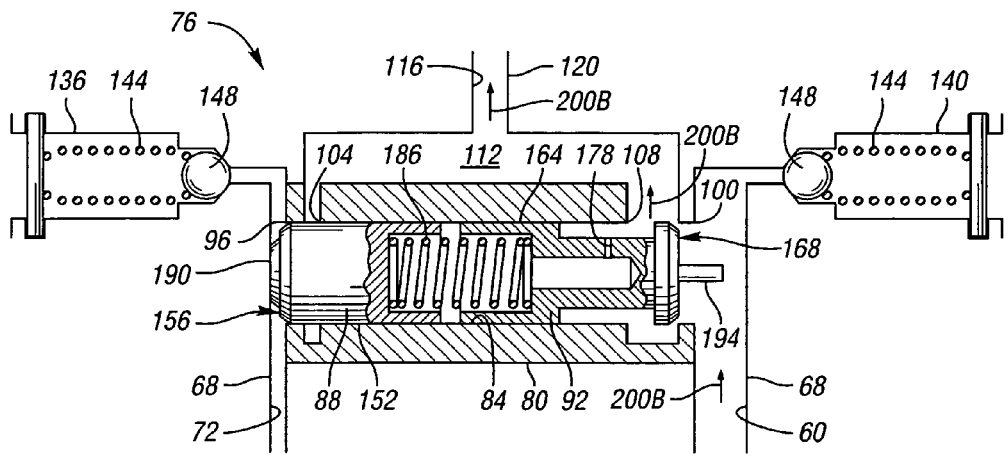
FIG. 6 is another schematic, partially cutaway side view of the valve assembly of FIG. 1.

Referring to FIG. 6, wherein like reference numbers refer to like components from FIG. 5, the auxiliary pump is shut down because the engine crankshaft has reached a speed sufficient to drive the main pump to produce adequate pressure in fluid 200B such that augmentation from the auxiliary pump is not needed.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
    a first pump configured to supply hydraulic pressure;
    a first power source operatively connected to the first pump and configured to selectively power the first pump;
    a second pump configured to supply hydraulic pressure;
    a second power source operatively connected to the second pump and configured to selectively power the second pump;
    a conduit defining a passageway;
    a transmission in fluid communication with the passageway; and
    a valve assembly;
    said valve assembly being sufficiently configured to operate in a first mode of operation in which the valve assembly provides fluid communication between the first pump and the passageway and prevents fluid communication between the second pump and the passageway, a second mode in which the valve assembly provides fluid communication between both of the first and second pumps and the passageway, and a third mode in which the valve assembly prevents fluid communication between the first pump and the passageway and provides fluid communication between the second pump and the passageway.

2. The powertrain of claim 1, wherein the valve assembly is configured such that the first mode automatically occurs when the first pump supplies hydraulic pressure that exceeds a first predetermined amount, and the second mode automatically occurs when the second pump supplies hydraulic pressure that exceeds a second predetermined amount.

3. The powertrain of claim 1, wherein the valve assembly includes a valve body defining a chamber characterized by a first port and a second port;
    a first shuttle being selectively translatable in the chamber between a first position in which the first shuttle obstructs the first port thereby to prevent fluid communication between the passageway and the first pump, and a second position in which the first pump is in fluid communication with the passageway; and
    a second shuttle being selectively translatable in the chamber between a first position in which the second shuttle obstructs the second port thereby to prevent fluid communication between the passageway and the second pump, and a second position in which the second pump is in fluid communication with the passageway.

4. The powertrain of claim 3, wherein the valve assembly further includes a spring situated between the first and second shuttles such that the spring biases the first and second shuttles in their respective first positions.

5. The powertrain of claim 4, wherein the first shuttle defines a first surface in fluid communication with the first pump, the first surface being sufficiently positioned such that sufficient hydraulic pressure on the first surface causes the first shuttle to translate from its first position to its second position; and wherein the second shuttle defines a second surface in fluid communication with the second pump, the second surface being sufficiently positioned such that sufficient hydraulic pressure on the second surface causes the second shuttle to translate from its first position to its second position.

6. A powertrain comprising:
    a first pump configured to supply hydraulic pressure;
    a second pump configured to supply hydraulic pressure;
    a conduit defining a passageway;

a valve assembly;

said valve assembly being sufficiently configured to operate in a first mode of operation in which the valve assembly provides fluid communication between the first pump and the passageway and prevents fluid communication between the second pump and the passageway, a second mode in which the valve assembly provides fluid communication between both of the first and second pumps and the passageway, and a third mode in which the valve assembly prevents fluid communication between the first pump and the passageway and provides fluid communication between the second pump and the passageway;

said valve assembly includes a valve body defining a chamber characterized by a first port and a second port;

a first shuttle being selectively translatable in the chamber between a first position in which the first shuttle obstructs the first port thereby to prevent fluid communication between the passageway and the first pump, and a second position in which the first pump is in fluid communication with the passageway; and a second shuttle being selectively translatable in the chamber between a first position in which the second shuttle obstructs the second port thereby to prevent fluid communication between the passageway and the second pump, and a second position in which the second pump is in fluid communication with the passageway;

wherein the second shuttle defines an orifice that provides fluid communication between the passageway and the chamber.

7. A valve assembly comprising:

a valve body defining a chamber being characterized by first, second, third, and fourth ports;

a first shuttle being selectively movable between a first position in which the first shuttle prevents fluid communication between the first and third ports, and a second position in which the first and third ports are in fluid communication with one another;

a second shuttle being selectively movable between a first position in which the second shuttle prevents fluid communication between the second and fourth ports, and a second position in which the second and fourth ports are in fluid communication with one another;

wherein said second shuttle defines an orifice through which the fourth port and the first shuttle are in fluid communication with one another.

8. The valve assembly of claim 7, wherein the valve body includes a surface at least partially defining said chamber, and wherein said first and second shuttles sealingly contact the surface.

9. The valve assembly of claim 7, further comprising a spring within the chamber between the first and second shuttles such that the spring biases the first and second shuttles in their respective first positions.

10. The valve assembly of claim 7, wherein the first shuttle is sufficiently configured and positioned such that sufficient pressure at the first port causes the first shuttle to move to its respective second position; and wherein the second shuffle is sufficiently configured and positioned such that sufficient pressure at the second port causes the second shuttle to move to its respective second position.

11. A method of providing hydraulic pressure to a transmission in a hybrid powertrain having a first pump driven by a first power source and a second pump driven by a second power source, the method comprising:

operating the powertrain in a first mode, which includes providing fluid communication between the first pump and the transmission while preventing fluid communication between the second pump and the transmission;

subsequent to said operating the powertrain in a first mode, operating the powertrain in a second mode, which includes simultaneously providing fluid communication between the first pump and the transmission and providing fluid communication between the second pump and the transmission; and subsequent to said operating the powertrain in a second mode, operating the transmission in a third mode, which includes preventing fluid communication between the first pump and the transmission while providing fluid communication between the second pump and the transmission.

* * * * *